United States Patent [19]

Trulaske, Sr.

[11] Patent Number: 4,955,486
[45] Date of Patent: Sep. 11, 1990

[54] GRAVITY FEED SHELF

[75] Inventor: Robert J. Trulaske, Sr., Frontenac, Mo.

[73] Assignee: True Manufacturing Co., Inc., O'Fallon, Mo.

[21] Appl. No.: 416,393

[22] Filed: Oct. 3, 1989

Related U.S. Application Data

[63] Continuation-in-part of Ser. No. 215,571, Jul. 6, 1988, Pat. No. 4,890,746.

[51] Int. Cl.⁵ .............................................. A47F 7/00
[52] U.S. Cl. .................................... 211/59.2; 211/153
[58] Field of Search ............... 211/59.2, 153, 49.1, 211/126, 134; 108/108

[56] References Cited

U.S. PATENT DOCUMENTS

| 3,320,011 | 5/1967 | Sachnoff et al. | 211/153 X |
| 4,128,177 | 12/1978 | Bustos | 211/59.2 |
| 4,136,783 | 1/1979 | Karashina | 211/59.2 |
| 4,238,022 | 12/1980 | Williams | 211/59.2 X |
| 4,346,806 | 8/1982 | Bustos | 211/59.2 X |
| 4,454,948 | 6/1984 | Spamer | 211/59.2 |
| 4,454,949 | 6/1984 | Flum | 211/59.2 |

Primary Examiner—Carl D. Friedman
Assistant Examiner—Sarah A. Lechok
Attorney, Agent, or Firm—Cohn, Powell & Hind

[57] ABSTRACT

An improvement to a gravity feed dispenser (D) for containers (C) having a guide assembly (A). The dispenser (D) includes spaced apart, longitudinally extending rails (34) and the improvement comprises a rectangular shaped overlay (3) of a low friction material. The overlay spans at least two rails and has a pair of longitudinally extending fingers (7) having outwardly turned ends (11) by which the overlay is attached to the two rails in a snap-fitting relation to secure the overlay in place.

5 Claims, 2 Drawing Sheets

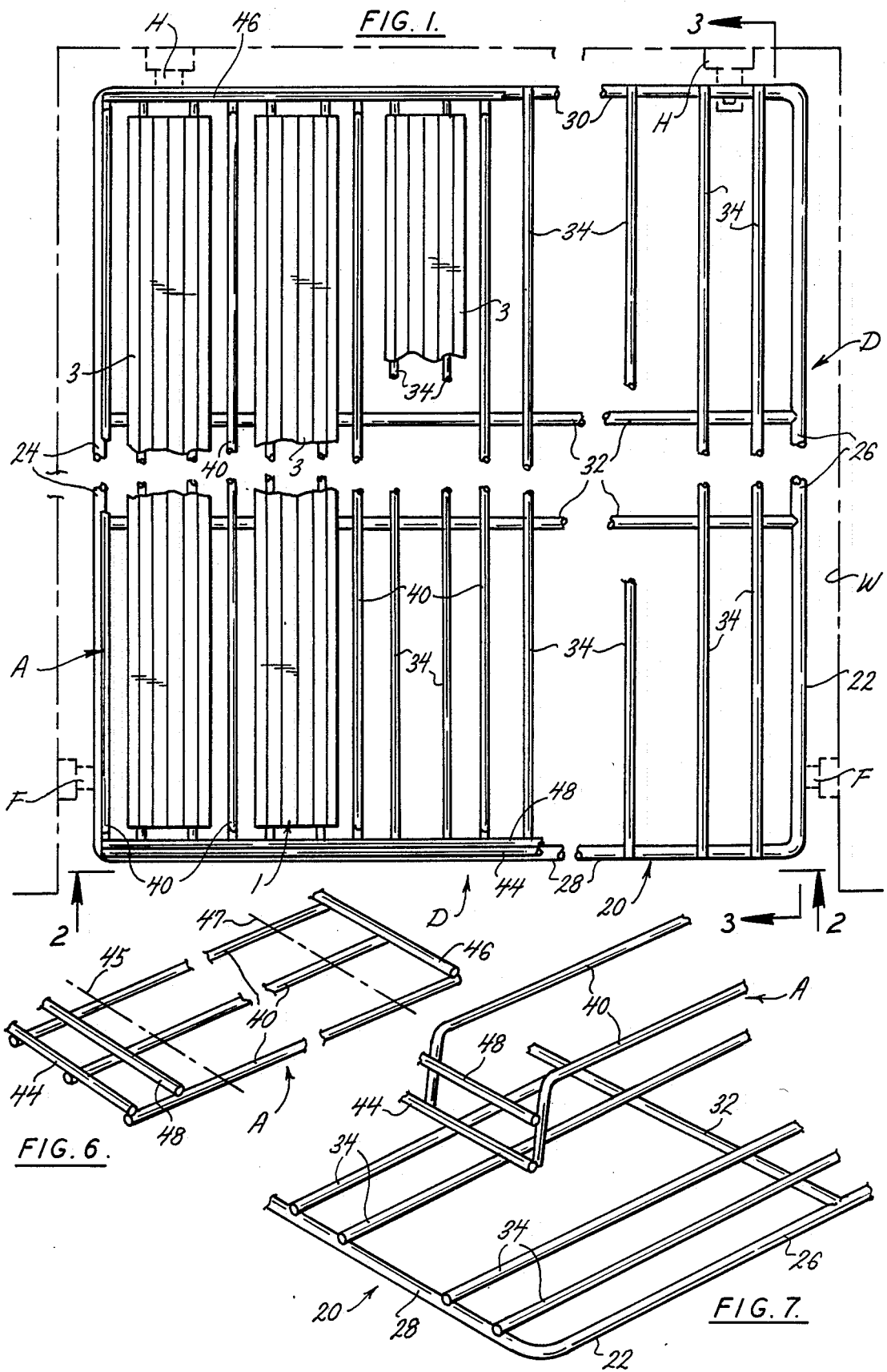

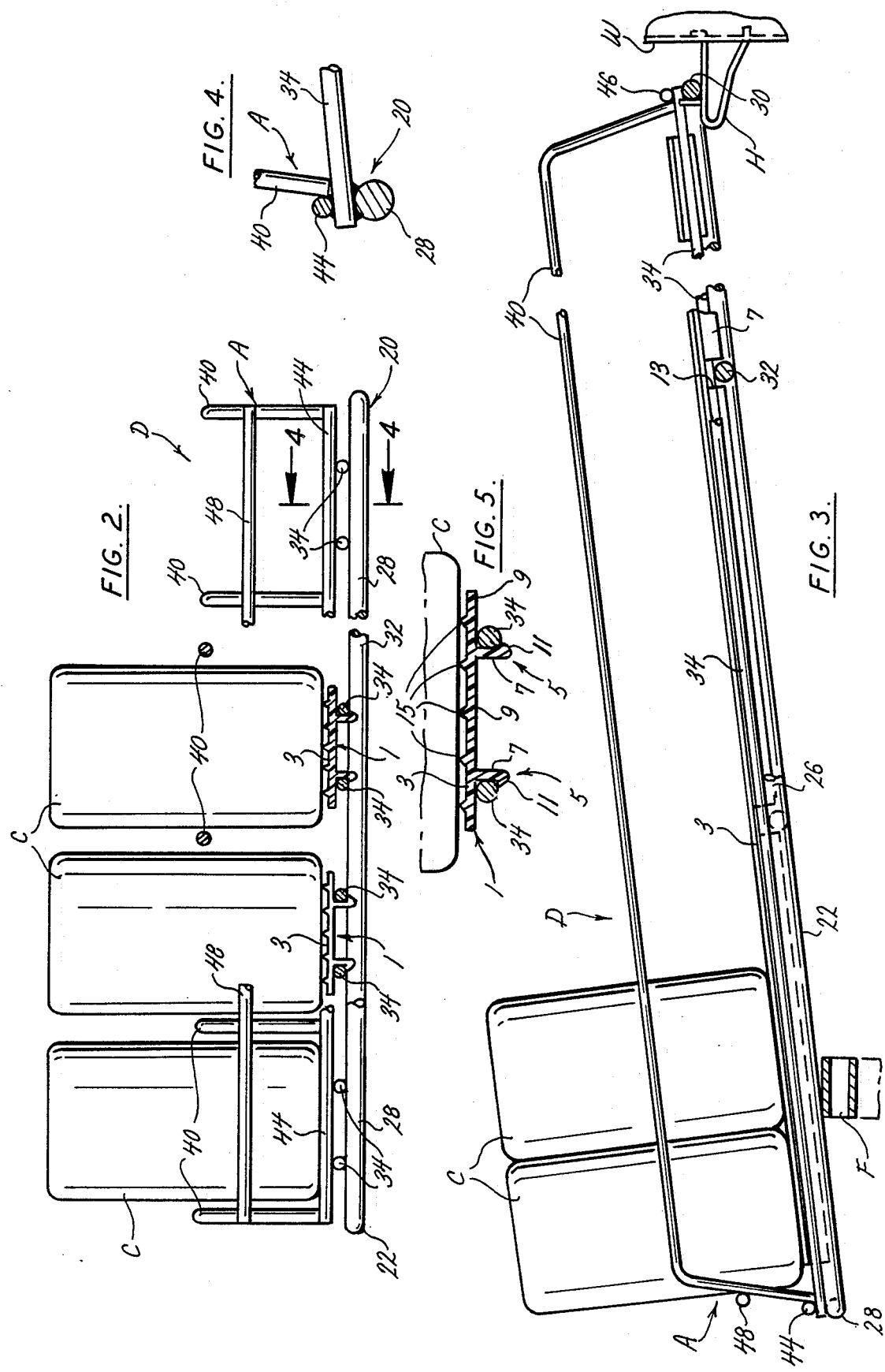

GRAVITY FEED SHELF

This application is a continuation-in-part of applicant's earlier filed application Ser. No. 215,571 filed July 6, 1988 now U.S. Pat. No. 4,890,746.

BACKGROUND OF THE INVENTION

This invention relates generally to gravity feed container dispensers for beverages, or the like, and more particularly, to an improvement for such dispensers.

A recent development in commercial refrigerators of the type used in supermarkets is a gravity feed beverage container dispenser. One dispenser of this type is shown in U.S. Pat. No. 4,294,363 As shown therein, a rack for supporting beverage containers is installed on a display stand or in a refrigerator unit so as to incline from back to front. Spaced apart guide rails are used so that containers placed on the rack are arranged in rows and feed forward, by gravity, when the frontmost container in the row is removed. A guard rail extending across the front of the rack keeps the containers from falling off.

While the above is a useful dispensing apparatus, one problem which may occur results from the friction between the bottom of the container and the rails comprising the rack upon which the containers rest. This friction could cause the container not to feed forward and thus increase customer annoyance in not being able to readily reach a container as well as causing a problem in the maintenance of the display or dispenser. The friction would typically result from the cold environment within a refrigeration unit as well as the wear which occurs on the rack over time. In addition, racks of the type discussed above are usually intended solely for gravity feed use rather than optional gravity feed or horizontal use.

Copending application Serial No. 215,571 discloses a gravity feed shelf similar to that discussed herein but is different in its particular structural arrangement of parts.

The present invention solves these and other problems in a manner not revealed by the known prior art.

SUMMARY OF THE INVENTION

The present invention provides an improvment to an inclined dispenser display which reduces friction between the container and thus facilitates the gravity feed of containers.

It is an aspect of this invention to provide an improvement for a gravity feed dispenser, the dispenser having a rack comprising a series of longitudinally extending rails which are parallel to each other and spaced apart a distance less than the diameter of the containers, the rack being adapted for installation so as to slope from rear to front when installed and having at least two guide bars extending longitudinally of the rack positioned above the rails, the guide bars being spaced apart a distance at least slightly greater than the diameter of the containers so the containers are formed in rows when placed on the rack, and a stop means extending transversely of the rail across the forward end thereof and positioned above the rails so as to block the forward movement of the containers when the forwardmost container in a row is removed and the other containers in a row feed forward, the improvement comprising friction reducing means to facilitate forward feeding of the containers, the friction reducing means including a removable overlay placeable over the rails, and having integrally formed attachment means for securing the overlay to the rack, the attachment means comprising a pair of longitudinal fingers extending from the underside of the overlay and snap-fitting onto two of the rails, the fingers being spaced apart to be closely adjacent the sides of each of said two rails and having turned ends overlapping said rails.

It is another aspect of this invention to provide that the overlay is rectangular in shape and the length of the overlay is substantially the same as that of the rails and the width of the overlay is such that the overlay spans two rails and overhangs each rail.

It is yet another aspect of this invention to provide that the longitudinal fingers are closely adjacent the inner sides of the rails and the fingers are outwardly turned.

It is still another aspect of this invention to provide that the rack includes lateral support rails running along the underside of the longitudinally extending rails at spaced intervals and the longitudinally extending fingers have notches formed therein to accommodate said support rails.

An aspect of this invention is that a guide assembly is provided including a plurality of inverted U-shaped guide bars extending longitudinally of the rack and having transversely extending front and rear bars connecting the ends thereof, said front an drear bars being fixedly attached to said rack rails.

Another aspect of this invention is to provide a method of forming a gravity feed dispensing assembly rack and guide assembly for snap-fitted friction reducing overlays, the method comprising the steps of forming a rack frame having side members and front and rear members, in substantially the same plane, fixedly attaching a plurality of longitudinally extending rail members between said frame front and rear members, laying a plurality of guide bars in parallel relation, fixedly attaching transverse bars across the opposed ends of said parallel bars, bending the guide bars into a U-configuration at two locations along bend lines disposed in spaced parallel relation from the said transverse bars, and fixedly attaching said transverse bars to the ends of the rack rails.

Yet another aspect of this invention is to provide a method including the further step of fixedly attaching a stop bar to said guide bars in parallel relation to said bend lines between one of said bend lines and one of said transverse bars, prior to said bending thereof.

It is another aspect of this invention to provide an overlay which is low in cost, and easy to install and maintain. Other aspects and features will be in part apparent and in part pointed out hereinafter.

BRIEF DESCRIPTION OF THE DRAWINGS

FIG. 1 is a top plan view of a rack for holding containers with the improvement of the present invention installed;

FIG. 2 is a sectional view taken along line 2—2 of FIG. 1;

FIG. 3 is a sectional view taken along line 3—3 in FIG. 1;

FIG. 4 is a sectional view taken along line 4—4 in FIG. 2;

FIG. 5 is a cross-section of an overlay comprising part of the improvement as installed;

FIG. 6 is a fragmentary perspective view of a guide assembly prior to bending; and FIG. 7 is an exploded fragmentary perspective view of a guide assembly and rack.

Corresponding reference characters indicate corresponding parts throughout the several views of the drawings.

DESCRIPTION OF THE PREFERRED EMBODIMENT

Referring now by reference numerals to the drawings and first to FIGS. 1 through 3, it will be understood that a gravity feed container dispenser is generally indicated by D and is intended for use with containers such as cans C. The dispenser D includes a rack 20 formed from a generally rectangular frame 22 having side members 24 and 26, front and rear members 28 and 30 and lateral, intermediate support members 32 extending between the side members of the frame and being in the same plane. The rack 20 also includes a plurality of longitudinally extending rails 34 overlying the combination of frame and support members and is attached thereto. The rack is preferrably integrally formed as by welding. The rails 34 are spaced apart laterally a distance substantially less than the diameter of the container C, carried by the rack. In the embodiment shown, the rack 20 is supported about its periphery as by front and rear brackets F and H respectively, supported by the wall W so that, as clearly shown in FIG. 3, it is inclined downwardly from the front to the rear by virtue of the rear supports being at a higher elevation than the front supports.

Dispenser D also includes a guide assembly A which is installed on the rack 20 includes a plurality of alternately arranged and generally U-shaped guide bars 40 connected at their ends by transversely extending front and rear bars 44 and 46 and provided with a blocking bar 48 constituting a stop means which extends across the front of guide assembly A and which restrains the containers from falling off the rack. To this extent, the Dispenser D is similar to that described in copending application Ser. No. 215,571 which is incorporated herein by reference. It is distinguished from the dispenser of Ser. No. 215,571 with respect to the structural arrangement and forming of the guide assembly A and the structural arrangement of a friction reducing means as discussed below.

As shown in FIG. 6, said guide assembly A, in the preferred embodiment, is first formed in a flat condition by attaching members 40, 44, 46 and 48, as by welding, and it is then bent in two locations along parallel lines 45 and 47 for ease of manufacture. This procedure avoids the necessity of utilizing a complicated jig assembly which would otherwise be required to form the guide bars 40 individually and then attach members 44, 46 and 48 and greatly simplifies the formation of the U-shaped configuration of the guide assembly as shown in FIG. 7. The guide assembly A is then firmly affixed to the longitudinal rails 34, as by spot welding, which is shown in FIGS. 3 and 4. The guide rails 40 are spaced apart a distance at least slightly greater than the diameter of guided container C so they do not restrict the gravity feed movement of said containers.

Racks of the type under consideration are generally formed from metal coated with plastic which does not provide the best sliding surface particularly after a long period of service. As a consequence, the containers do not feed forward as they should when the forwardmost container in the row is removed.

In the present invention there is a friction reducing means 1 which includes an overlay 3 placeable over a pair of rails 34 centered between the guide bars 40, the rails 34 being arranged in equally spaced pairs in the embodiment shown. Overlay 3, which is made of an extruded synthetic resin material having low friction characteristics is rectangular in shape. The length of the overlay is substantially the same as that of the rails 34, while the width is such that the overlay spans at least two rails when the overlay is in place. As shown in FIG. 1, the preferred embodiment, the width of the overlay 3 is such that it spans and overhangs two rails; but it will be understood that width could be wider or, within the limits noted above, narrower.

Friction reducing means 1 also includes attachment means 5 for removably securing the overlay to the rack. Means 5 includes a pair of longitudinal fingers 7, integrally formed with the overlay, and extending from the underside 9 thereof. Each finger 7 is turned at the end 11 and said fingers 7 are spaced apart a distance substantially equal to the distance between said longitudinal rails 34. In the embodiment shown in FIG. 5, the longitudinal fingers 7 are spaced apart to be closely adjacent or to engage the inner sides of rails 34 and the finger ends 11 are outwardly turned to overlap the rails 34, said finger ends being provided with an inclined face and a shoulder to facilitate the snap-fitting action. Alternatively, the fingers could be spaced apart to be closely adjacent to or engage the outer sides cf rails 34, said finger ends being inwardly turned to overlap the rails. With either arrangement the overlay 3 is securely to two rails by only two fingers 11. This permits a snap fit between the overlay and the rack to securely attach the overlay to associated sides of each of two spaced rails, said turned ends overlapping said spaced rails. Finally, the fingers are notched at 13 to accommodate the laterally extending support rails 32. The overlay is thus easily installed or removed from the rack and different width overlays can be installed as different size containers are placed on the rack for dispensing.

In the preferred embodiment, the overlay 3 includes a plate portion having relatively thin longitudinal ribs 15 which further reduce the friction between the containers C and the overlay. Also, material from which the overlay is extruded is high impact styrene with coextruded silicone which still further reduces friction.

It will be understood that the removable nature of the overlay permits optional use of refrigerator shelving for gravity feed or for use in conventional horizontal mode in which gravity is not required.

Having described the invention in detail, those skilled in the art will appreciate that modifications may be made without departing from the spirit. Therefore, it is not intended that the scope of the invention be limited to the specific embodiments illustrated and described. Rather, it is intended that the scope of this invention be determined by the appended claims and their equivalents.

I claim as my invention:

1. In a gravity feed container dispenser, the dispenser having a rack on which the containers are placed with the rack comprising a series of longitudinally extending rails which are parallel to each other and spaced apart a distance less than the diameter of the containers, the rack being adapted for installation so as to slope from rear to front when installed and having at least two guide bars extending longitudinally of the rack and positioned above the rails, the guide bars being spaced apart a distance at least slightly greater than the diameter of the containers so the containers are formed in rows when placed on the rack, and a stop means extending transversely of the rail across the forward end thereof and positioned above the rails so as to block forward movement of the containers when the forwardmost container in a row is removed and the other containers in the row feed forward, the improvement comprising friction reducing means to facilitate forward feeding of the containers, the friction reducing means including a removable overlay placeable over the rails and having integrally formed attachment means for securing the overlay to the rack, the attachment means comprising a pair of longitudinal fingers extending from the underside of the overlay and snap-fitting onto two of the rails, the fingers being spaced apart to be closely adjacent the sides of each of said two rails and having turned ends overlapping said rails.

2. The improvement of claim 1 wherein the overlay is rectangular in shape and the length of the overlay is substantially the same as that of the rails and the width of the overlay is such that the overlay spans two rails and overhangs each rail.

3. The improvement of claim 1 wherein the longitudinal fingers are closely adjacent the sides of the rails and the fingers are outwardly turned.

4. The improvement of claim 1 wherein the rack includes laterial support rails running along the underside of the longitudinally extending rails at spaced intervals and the longitudinally extending fingers have notches formed therein to accommodate said support rails.

5. The improvement of claim 1 wherein a guide assembly is provided including a plurality of inverted U-shaped guide bars extending longitudinally of the rack and having transversely extending front and rear bars connecting the ends thereof, said front and rear bars being fixedly attached to said rack rails.

* * * * *